United States Patent
Silvandersson et al.

(12) 
(10) Patent No.: US 6,438,894 B1
(45) Date of Patent: *Aug. 27, 2002

(54) ARRANGEMENT FOR AN INSECT TRAP

(76) Inventors: Kenneth Silvandersson, Uddared, S-310 20, Knäred (SE); Kjell Silvandersson, Dalavägen 44, S-310 20, Knäred (SE)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/194,485
(22) PCT Filed: Mar. 26, 1998
(86) PCT No.: PCT/SE98/00561
§ 371 (c)(1), (2), (4) Date: Nov. 25, 1998
(87) PCT Pub. No.: WO98/42186
PCT Pub. Date: Oct. 1, 1998

(30) Foreign Application Priority Data

Mar. 26, 1997 (SE) ............................................. 9701110

(51) Int. Cl.$^7$ ............................................. A01M 1/14
(52) U.S. Cl. ............................................. 43/114
(58) Field of Search ............................ 43/114, 115, 116, 43/107, 132.1, 136

(56) References Cited

U.S. PATENT DOCUMENTS

| | | | | |
|---|---|---|---|---|
| 537,060 A | * | 4/1895 | Mitchamore | 43/114 |
| 1,451,583 A | * | 4/1923 | McCardia | 43/115 |
| 1,655,128 A | * | 1/1928 | Berghom | 43/114 |
| 3,653,145 A | * | 4/1972 | Stout | 43/131 |
| 4,069,615 A | * | 1/1978 | Gilbert | 49/58 |
| 4,227,333 A | * | 10/1980 | Levinson et al. | 43/107 |
| 4,411,093 A | * | 10/1983 | Stout et al. | 43/114 |
| 4,992,268 A | * | 2/1991 | Landolt et al. | 424/77 |
| 5,253,448 A | * | 10/1993 | Byom | 43/114 |
| 5,303,501 A | * | 4/1994 | Seemann | 43/114 |
| 5,383,301 A | * | 1/1995 | Babb | 43/114 |
| 5,458,231 A | * | 10/1995 | Belokin et al. | 206/756 |
| 5,839,221 A | * | 11/1998 | Ron et al. | 43/132.1 |
| 5,884,801 A | * | 3/1999 | Simpson | 220/495.08 |
| 5,896,695 A | * | 4/1999 | Walker | 43/107 |
| 5,907,923 A | * | 6/1999 | Heath et al. | 43/122 |
| 6,178,687 B1 | * | 1/2001 | Frisch | 43/114 |

FOREIGN PATENT DOCUMENTS

| | | | | |
|---|---|---|---|---|
| EP | 475665 A1 | * | 3/1992 | |
| GB | 1297 | * | 1/1912 | 43/116 |
| GB | 2210543 A | * | 6/1989 | |
| JP | 2151433 A | * | 6/1990 | |

* cited by examiner

Primary Examiner—Darren W. Ark

(57) ABSTRACT

An arrangement for an insect trap includes a surface with adhesive for retaining files and similar winged insects upon it where the surface has a pattern of three dimensional objects for attracting insects to fly into the trap. In order to increase trap efficiency, fluorescent color paint is used on the catch surface.

10 Claims, 2 Drawing Sheets

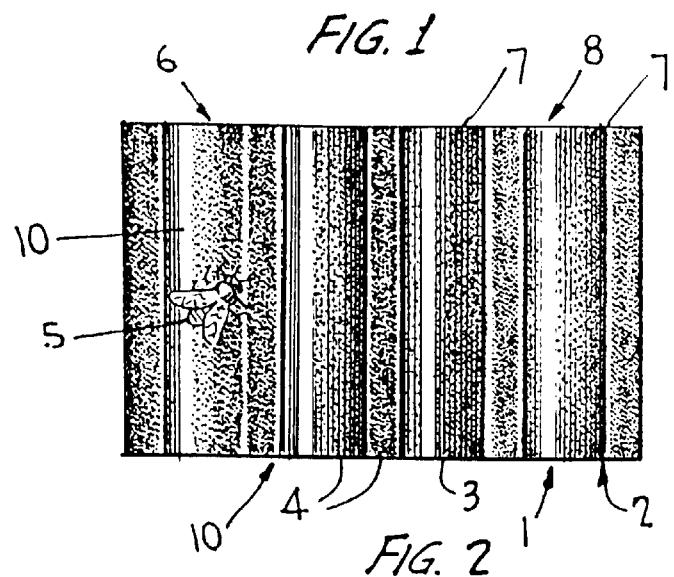
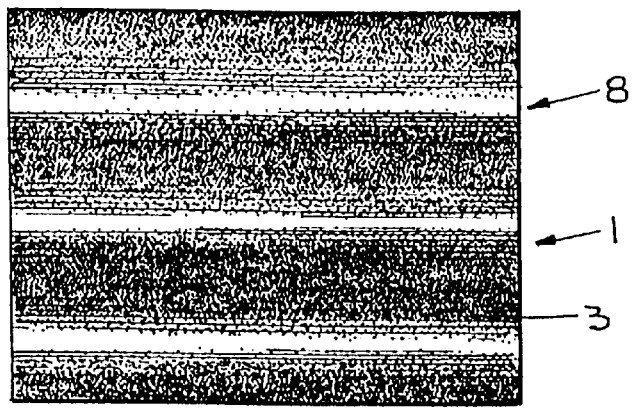
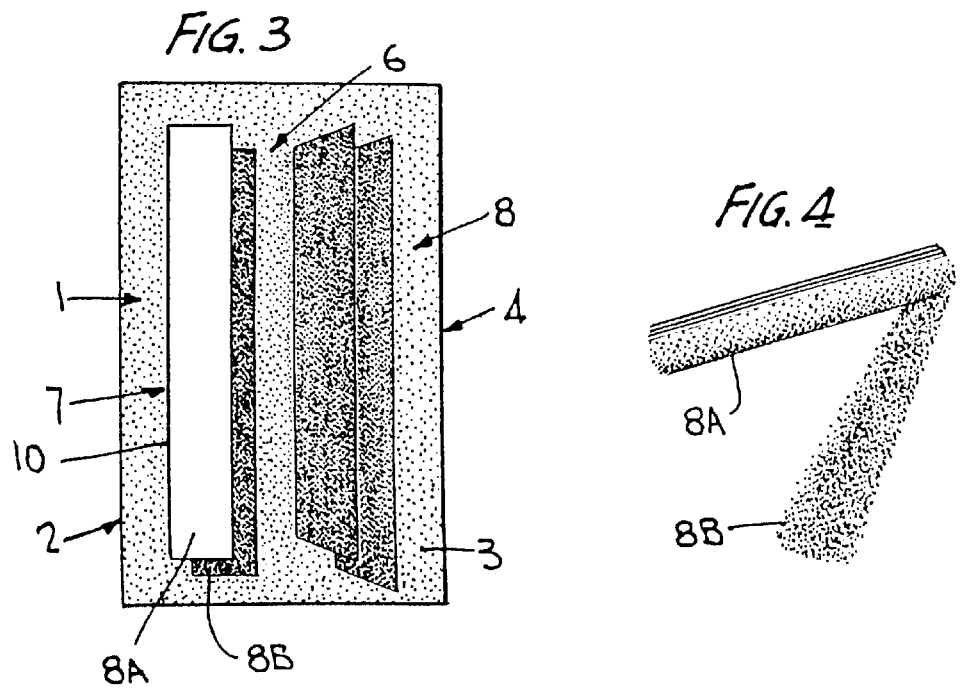

ARRANGEMENT FOR AN INSECT TRAP

BACKGROUND

1. Field of the Invention

The present invention relates to an arrangement for an insect trap which is provided with a surface with adhesive for retaining flies and similar winged insects upon it, and that said surface has a pattern for attracting insects to fly to the trap.

It is previously known that flies and other flying insects often land in the area of an edge of the object that they land upon. Known insect traps are provided with a catch surface upon which insects are intended to be caught upon and therefore is coated with a suitable strong sticky adhesive of non-polluting kind. Those insect traps are preferably formed by cardboard strips, plastic pieces or other materials which are provided with adhesive or other means for retaining the trap at the intended catch location, e.g. at a windowpane, a wall or for arrangement or suspension of the trap in question, e.g. in stables, shops, windowsills, among flowers etc.

2. Discussion of the Prior Art

A plurality of flies have been printed upon the trap in order to thereby try to attract flies etc. to be drawn to the trap and this has been effective even if not so many edges have been located on the trap.

An object of the present invention is increasing catch efficiency in a simple to use and cost effective manner.

SUMMARY OF THE INVENTION

Said object is achieved by means of an arrangement according to the present invention, which is substantially characterized in that the pattern includes images rendered in 3D.

DESCRIPTION OF THE DETAILED DRAWINGS

The invention will be described in the following as a number of preferred embodiments, wherein is referred to the drawings on which FIG. 1 shows a first image pattern of the invention;

FIG. 2 shows a second image pattern of the invention;

FIG. 3 shows a first three dimensional pattern;

FIG. 4 shows a second three dimensional pattern:

Figure 5:
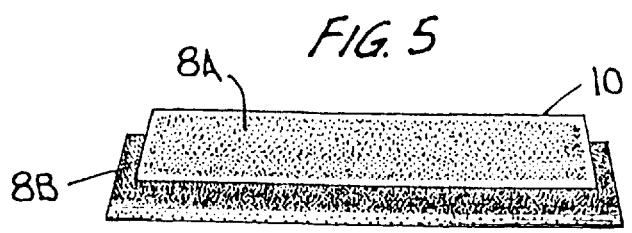
FIG. 5 shows a third three dimensional pattern.
Figure 6:
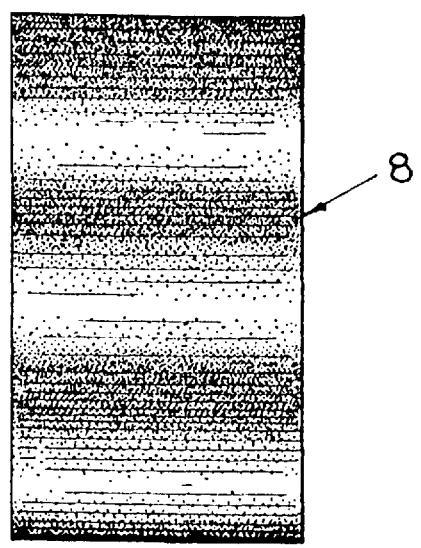
FIG. 6 shows a third image pattern.

An arrangement 1 for an insect trap 2 which is provided with at least one surface 3 that has been coated with adhesive 4 of a suitable kind in order to be able to retain flies 5 and similar winged insects upon it, and which surface has a pattern 6 for attracting insects to fly to the trap 2 and land upon it has the pattern arranged in a special way. More exactly, the pattern includes images 7 rendered in 3D so that you get an illusion of three-dimensional view of the flat sheet etc. which the trap is made up of.

For example, the pattern may consist of a number of images of shaped objects 8 which cover said catch surface 3 of the trap. Said images of string-shaped objects 8 are preferably parallel to each other, so that a large surface 3 may be covered by such images of images of string shaped objects 8.

Figure 7:
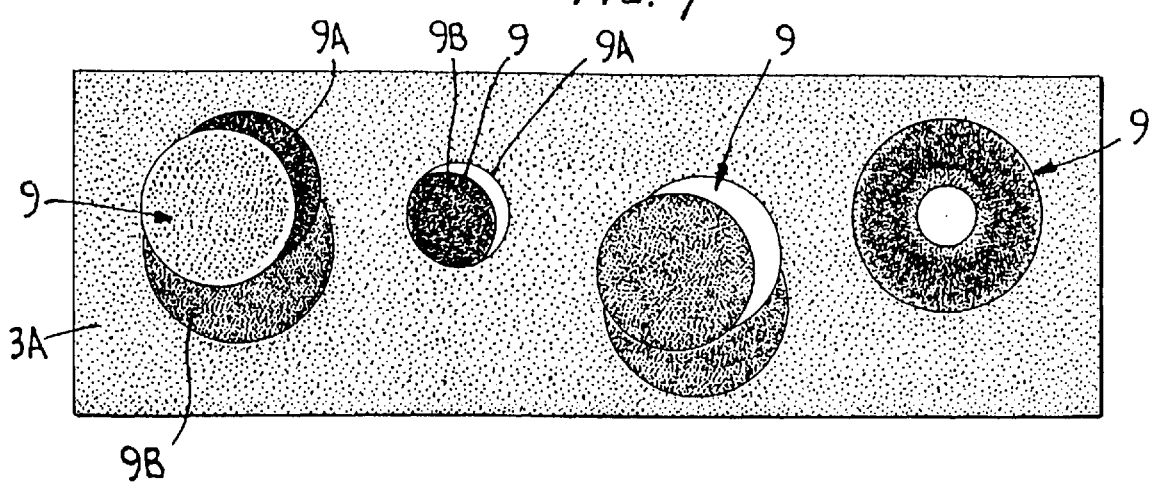
FIG. 7 shows a fourth three dimensional pattern.

In FIG. 7 is shown an example of a trap where a plurality of circular objects 9 of different configurations are distributed along the catch surface 3 of the trap, for example holes or buttons. The mentioned objects 9 may vary in size as seen along the catch surface 3 of the trap, for example as is shown in FIG. 7.

The mentioned objects 8, 9 may be formed by a main image 8A, 9A with an adjacent shadow image 8B, 9B, wherein the main image 8A, 9A suitably is colored. The shadow image 8B, 9B extending from an edge of the main and also being darker in color than the main image 8A, 9A.

Also the surrounding catch surface 3A of the trap 2 is provided with a colored surface and which differs from the colour of the main image 8A, 9A and the shadow image 8B, 9B.

Preferably, said main image 8A, 9A is provided with a marked contour 10 in order to further increase the sense of edge for the images.

The catch surface 3, 3A, and thus also the images 8, 9 suitably exhibit so called luminous paint, formed images of string-shaped objects 8 and circular-shaped objects 9 printing with fluorescent or phosphorescent deep printing color wherein the luminescence is arranged to considerably increase the effective visibility of the trap at reduced access to light, i.e. in the morning and the evening. For example that red-, yellow- or orange color is applied by deep printing before the adhesive 4 in question is applied to the catch surface 3. So when insects 5 see the trap 2 they by preference land upon the distinctly visualized edges of the images of string-shaped objects 8 and circular-shaped objects 9 in question, whereby a lot more insects are drawn to the trap 2 and are caught in the adhesive 4 than at known traps of similar size However, the invention is not limited to the shown and described embodiments, but may be varied within the scope of the claims without departing from the inventive concept.

What is claimed is:

1. An insect trap comprising a catch surface, said catch surface including thereon, an adhesive for retaining flies and similar winged insects, said surface having a pattern for attracting insects to fly to the trap, wherein the pattern includes printed three dimensional images of objects, which said images are formed by a fluorescent main image with an adjacent shadow image, said shadow image extending from an edge of and being darker in color than the main image, said main image being provided with a marked contour, and said pattern including an appearance of edges upon visualization.

2. The trap according to claim 1, wherein the pattern covers the catch surface of the trap with a number of images of string shaped objects.

3. The trap according to claim 2, wherein the images are parallel to each other.

4. The trap according to claim 1, wherein a number of the images are of circular objects distributed along the catch surface.

5. The trap according to claim 4, wherein the images vary in size.

6. The trap according to claim 1, wherein the catch surface is provided with a colored surface.

7. An insect trap comprising a catch surface, said catch surface including thereon, an adhesive for retaining flies and similar winged insects, said surface having a pattern for attracting insects to fly to the trap wherein the pattern includes printed three-dimensional images of objects, which said images are formed by a fluorescent main image with an adjacent shadow image, said shadow image extending from an edge of and being darker in color than the main image, said main image being provided with a marked contour, said pattern covering the catch surface of the trap with a number of images of string-shaped objects and said pattern including an appearance of edges upon visualization.

8. The according to claim 7, wherein the catch surface is provided with a colored surface.

9. An insect trap comprising a catch surface, said catch surface including thereon, an adhesive for retaining flies and similar winged insects, said surface having a pattern for attracting insects to fly to the trap wherein the pattern includes printed three-dimensional images of objects, which said images are formed by a fluorescent main image with an adjacent shadow image, said shadow image extending from an edge of and being darker in color than the main image, said main image being provided with a marked contour, said pattern covering the catch surface of the trap with a number of images of circular objects and said pattern including an appearance of edges upon visualization.

10. The trap according to claim 9, wherein the catch surface is provided with a colored surface.

* * * * *

UNITED STATES PATENT AND TRADEMARK OFFICE
CERTIFICATE OF CORRECTION

PATENT NO. : 6,438,894 B1
DATED : August 27, 2002
INVENTOR(S) : Kenneth Silvandersson et al.

It is certified that error appears in the above-identified patent and that said Letters Patent is hereby corrected as shown below:

<u>Title page,</u>
Insert -- [74] *Attorney, Agent, or Firm* - Breiner & Breiner, L.L.C. --.

<u>Column 1,</u>
Line 10, between the first and second paragraphs, insert -- 2. Discussion of the Prior Art --.
Line 22, delete "2. Discussion of the Prior Art".
Line 45, "pattern:" should read -- pattern; --.

<u>Column 2,</u>
Line 1, "mentioned objects" should read -- mentioned circular objects --.
Line 7, after "main" insert -- image --.
Line 11, "colour" should read -- color --.
Line 17, delete "images 8, 9" and insert -- images of string-shaped objects 8 and circular-shaped objects 9 --.
Bridging lines 19 and 20, delete "images of string-shaped objects 8 and circular-shaped objects 9".
Line 19, before "print-" insert -- formed by --.

<u>Column 3,</u>
Line 4, "The" insert -- trap --.

Signed and Sealed this

Twenty-fourth Day of December, 2002

JAMES E. ROGAN
*Director of the United States Patent and Trademark Office*

UNITED STATES PATENT AND TRADEMARK OFFICE
CERTIFICATE OF CORRECTION

PATENT NO. : 6,438,894 B1
DATED : August 27, 2002
INVENTOR(S) : Kenneth Silvandersson et al.

It is certified that error appears in the above-identified patent and that said Letters Patent is hereby corrected as shown below:

<u>Title page,</u>
Insert -- [74] *Attorney, Agent, or Firm* - Breiner & Breiner, L.L.C. --.

<u>Column 1,</u>
Line 10, between the first and second paragraphs, insert -- 2. Discussion of the Prior Art --.
Line 22, delete "2. Discussion of the Prior Art".
Line 45, "pattern:" should read -- pattern; --.

<u>Column 2,</u>
Line 1, "mentioned objects" should read -- mentioned circular objects --.
Line 7, after "main" insert -- image --.
Line 11, "colour" should read -- color --.
Line 17, delete "images 8, 9" and insert -- images of string-shaped objects 8 and circular-shaped objects 9 --.
Bridging lines 19 and 20, delete "images of string-shaped objects 8 and circular-shaped objects 9".
Line 19, before "print-" insert -- formed by --.

<u>Column 3,</u>
Line 4, after "The" insert -- trap --.

This certificate supersedes Certificate of Correction issued December 24, 2002.

Signed and Sealed this

Fifth Day of August, 2003

JAMES E. ROGAN
*Director of the United States Patent and Trademark Office*